US007133079B2

United States Patent
Gleim

(10) Patent No.: US 7,133,079 B2
(45) Date of Patent: Nov. 7, 2006

(54) CIRCUIT COMPRISING A COMBINED SIGNAL AND ENVIRONMENTAL LIGHT SENSOR

(75) Inventor: Günter Gleim, Villingen-Schwenningen (DE)

(73) Assignee: Thomson Licensing, Boulogne-Billancourt (FR)

( * ) Notice: Subject to any disclaimer, the term of this patent is extended or adjusted under 35 U.S.C. 154(b) by 534 days.

(21) Appl. No.: 10/343,361

(22) PCT Filed: Jul. 30, 2001

(86) PCT No.: PCT/EP01/08795
§ 371 (c)(1),
(2), (4) Date: Jan. 30, 2003

(87) PCT Pub. No.: WO02/12844

PCT Pub. Date: Feb. 14, 2002

(65) Prior Publication Data
US 2004/0012719 A1  Jan. 22, 2004

(51) Int. Cl.
*H04N 5/57* (2006.01)
*G01J 1/44* (2006.01)
(52) U.S. Cl. ............... 348/602; 348/553; 250/214 AL
(58) Field of Classification Search ............... 348/602, 348/603, 227.1, 68, 74, 75, 734, 553, 235–237, 348/216.1, 221.1; 345/10, 11, 207; 436/164, 436/172; 340/545.3, 555; 398/106, 112; 725/10, 12; 600/110, 160, 178, 180, 181; 250/339.01–339.05, 349, 214 AL; 362/4, 362/5, 8, 276
See application file for complete search history.

(56) References Cited

U.S. PATENT DOCUMENTS

| 4,782,386 | A | * | 11/1988 | Ams et al. | ............... 348/68 |
| 5,055,667 | A | * | 10/1991 | Sayag | ............... 250/208.1 |
| 5,164,714 | A | * | 11/1992 | Wehrer | ............... 345/175 |
| 5,406,305 | A | | 4/1995 | Shimomura et al. | ............... 345/102 |
| 5,786,801 | A | * | 7/1998 | Ichise | ............... 345/102 |
| 5,868,666 | A | * | 2/1999 | Okada et al. | ............... 600/118 |
| 6,176,429 | B1 | * | 1/2001 | Reddersen et al. | .... 235/462.25 |
| 6,234,957 | B1 | * | 5/2001 | Okada | ............... 600/109 |
| 6,297,859 | B1 | * | 10/2001 | George | ............... 348/747 |
| 6,334,845 | B1 | * | 1/2002 | Higuchi et al. | ............... 600/181 |
| 6,522,078 | B1 | * | 2/2003 | Okamoto et al. | ............... 315/149 |

FOREIGN PATENT DOCUMENTS

| DE | 19834122 | 2/2000 |
| EP | 710017 | 5/1996 |
| WO | 94/18790 | 8/1994 |

\* cited by examiner

*Primary Examiner*—Victor R. Kostak
(74) *Attorney, Agent, or Firm*—Joseph J. Laks; Robert D. Shedd; Reitseng Lin

(57) ABSTRACT

In indication and image reproduction apparatus, the ambient brightness must be taken into account for an optimum reproduction quality. This requires an optical sensor, which is associated with additional technical outlay. The invention relates to a circuit which allows the ambient brightness to be determined by means of a sensor that is already present in the device, for the reception of data or control signals. In particular for apparatus appertaining to consumer electronics.

14 Claims, 1 Drawing Sheet

CIRCUIT COMPRISING A COMBINED SIGNAL AND ENVIRONMENTAL LIGHT SENSOR

This application claims the benefit, under 35 U.S.C. § 365 of International Application PCT/EP01/08795, filed Jul. 30, 2001, which was published in accordance with PCT Article 21(2) on Feb. 14, 2002 in German and which claims the benefit of German Application No. 10038064.6 filed Aug. 4, 2000.

FIELD OF THE INVENTION

The invention relates to a circuit for evaluating optical signals. It is based in particular on a circuit in accordance with the preamble of Claim 1.

BACKGROUND OF THE INVENTION

In devices with luminous indications, displays, or means for projection, the readability of the indication or the representation quality of images can vary considerably with the brightness of the ambient light. Under changing light conditions, the user generally has the opportunity to adapt specific operating parameters of the device, such as brightness or contrast, for instance, to the light conditions in the vicinity of the apparatus. In order to spare the user manual adaptation, various apparatus already have automatic adaptation of specific operating parameters to the brightness of the ambient light. The detection of the ambient brightness that is required for automatic adaptation is usually based on an optical sensor fitted in the housing of the apparatus, generally pointing in the direction of the observer. The signal made available by the ambient light sensor is fed to a regulating arrangement which automatically performs optimum adaptation of the operating parameters to the ambient brightness. The application of such automatic adaptation is appropriate, inter alia, in televisions, video projection devices, dashboard illuminations or devices with liquid crystal displays such as portable computers or mobile telephones.

Although the above-described method for adapting the operating parameters of an indication or projection apparatus to the ambient brightness is already used in commercially available apparatus, at the present time it is employed only in a small number of, usually high-quality, devices. The reason for this is that the sensor required for measuring the ambient brightness causes relatively high additional product costs, on the one hand because of the costs for the component per se but on the other hand because of the precautions which are necessary for incorporating the sensor in the apparatus housing. In addition, the optical sensor can entail restrictions for the configuration of the apparatus housing which, under certain circumstances, cannot be harmonized with a miniaturization or a specific aesthetic configuration of the housing.

It is desirable because of this to provide a circuit for detecting the ambient brightness with the least possible additional technical outlay.

SUMMARY OF THE INVENTION

The invention described in Claim 1 proposes such a circuit. According to the invention, the sensor that is present anyway in many apparatus, for the reception of control or data signals, is in this case simultaneously used for determining the ambient brightness.

Said sensor is generally fitted in the direction of the user and thus has an optimum position for determining the ambient brightness. Moreover, the spectral range in which (infrared) sensors that are currently used are sensitive for control or data signals also covers the visible part of the spectral range. Since the infrared component contained in the ambient light is proportional to the intensity of the visible light, it is ensured that the ambient light can be detected just as well as by a separate sensor. The separation of ambient brightness and control or data signals becomes technically possible by virtue of the fact that the ambient light is essentially constant and thus brings about a signal that varies only slowly at the optical sensor, while control and data signals are characterized by fast, pulsed changes which, for example in the case of the infrared receiver LTM-9237-33 from the company Liton, are of the order of magnitude of 30 kHz. The separation of control or data signals and ambient brightness can thus be attributed to a separation of fast and slowly varying signal components.

The simultaneous use of the optical sensor for control or data signals as sensor for the ambient brightness makes it possible to omit an additional optical sensor, as is currently necessary in regulating arrangements, and the associated measures such as cut-outs on the housing, cable feeds, etc. The detection of the ambient brightness in devices which already have an optical sensor for receiving control or data signals anyway, can thus be implemented significantly more favourably by means of the invention.

BRIEF DESCRIPTION OF THE DRAWINGS

Exemplary embodiments of the circuit according to the invention are illustrated diagrammatically in the drawing.

In the figures.

DETAILED DESCRIPTION OF PREFERRED EMBODIMENTS

Figure 1:
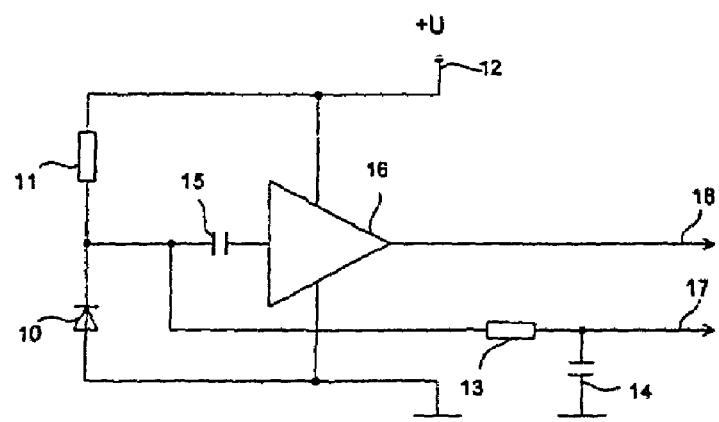
FIG. 1 shows a first exemplary embodiment of the invention.

FIG. 1 illustrates one possible embodiment of a drive circuit according to the invention using the example of an infrared (IR) sensor for the reception of control signals of an infrared remote control. The circuit diagram diagrammatically shows an IR diode 10, which is operated via a resistor 11 from a voltage source 12 with the voltage U. The voltage signal dropped across the IR diode is forwarded on the one hand via a low-pass filter 13, 14 to an output 17 for the regulation of the operating parameters such as brightness or contrast, for example, and on the other hand via a capacitor 15 and operational amplifier 16 connected downstream to the output 18 to the signal decoder for processing the remote control signals. Thus, in the existing circuit, the rapidly varying signal components, which can pass through the capacitor 15 upstream of the operational amplifier but are blocked by the low-pass filter 13, 14 are separated from the essentially constant signal components, which, conversely, are blocked by the capacitor and allowed to pass by the low-pass filter. The latter are proportional to the ambient brightness and can be fed to a regulating arrangement which adapts the contrast of the image, for instance, in response to the brightness of the ambient light. The circuit described disregards the fact that, in the case of high ambient brightness, the voltage across the IR diode 10 can collapse under certain circumstances.

Figure 2:
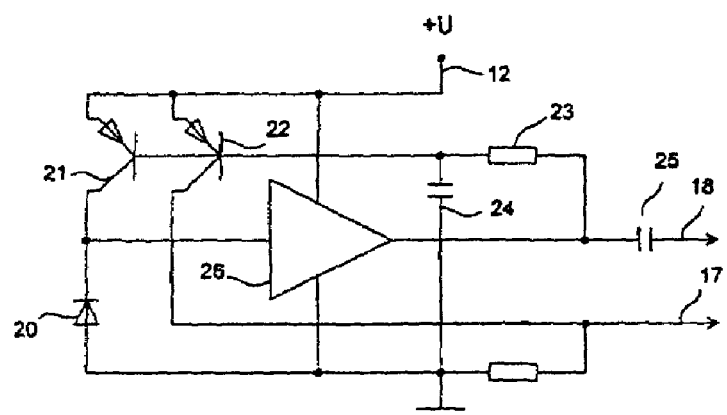
FIG. 2 shows a second exemplary embodiment of the invention.

FIG. 2 diagrammatically shows a further exemplary embodiment of a drive circuit according to the invention, which avoids this problem. Two transistors 21, 22 are additionally provided, whose bases are connected to the output of the operational amplifier 26 via a low-pass filter 23, 24. The transistor 21 readjusts the current through the infrared reception diode 20 in accordance with the ambient brightness in such a way that the voltage across the diode remains virtually unchanged and a collapse in the voltage at high ambient brightness is preclude. The transistor 22, whose base is connected in parallel with the base of the first transistor, correspondingly supplies a signal which reflects the ambient brightness.

Figure 3:
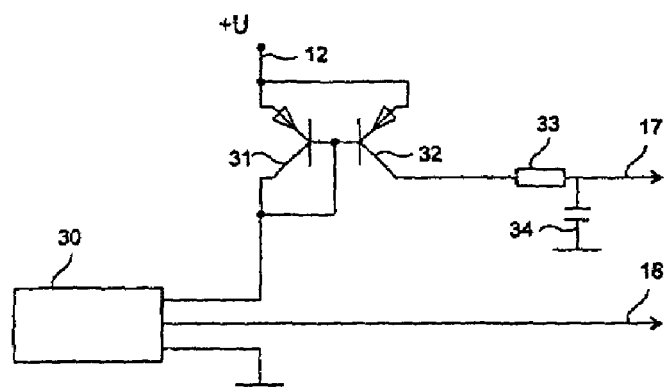
FIG. 3 shows a third exemplary embodiment of the invention.

FIG. 3 shows a further advantageous embodiment of the invention, which is based on the combination of a current mirror comprising the transistors 31, 32 with commercially available IR reception modules 30. The circuit is suitable for reception modules whose current consumption is essentially determined by the current consumption of the reception diode and thus by the ambient brightness. In order to obtain the ambient brightness, the current taken up by the reception module in this case need merely be copied by a current mirror circuit 31, 32 and be filtered by means of a low-pass filter 33, 34. The ambient brightness can then be obtained at the output 17 from the change in the offset value relative to the basic current consumption in darkness. The circuit thus has the advantage that commercially available IR reception modules (e.g. LTM-9237-33 from Liton), as are currently used as standard in the mass production of consumer electronics, can be used unchanged.

The last-mentioned embodiment, in particular, shows that, by virtue of the invention, it is possible to realize a detection with an extremely low additional technical outlay.

It shall additionally be noted that the invention can be transferred without difficulty to other areas by a person skilled in the art. Only a few further examples shall be mentioned at this point, such as mobile telephones with an IR interface, in the case of which the display brightness is to be regulated in response to the ambient brightness, IR receivers in motor vehicles, for opening and closing the vehicle, in the case of which the illumination of the interior space or of the indication elements is to be regulated simultaneously, or a slide or video projector whose lamp power is to be regulated in response to the ambient light.

Environment-Dependent Automatic Luminance Control for Display Screens

The present invention relates to a method as well as a device, with the aid of which the luminance or brightness, contrast or background illumination of display screens is automatically and continuously adjusted as a function of the particular average ambient luminance in the field of vision of the user.

Recent ergonomic studies have demonstrated that the luminance distribution in the field of vision of the user must not exceed specific proportions in order to be able to work free of fatigue with display screens. Thus the luminance studies in the center field of the field of vision must not exceed a ratio of three to one. In the environment of the field of vision luminance differences in a ratio of one to ten are permissible. Since in offices the luminance distribution varies strongly as a function of the outside light intensity and weather conditions, the manual setting capability of the display screen brightness and of the contrast is an unsatisfactory static solution. The brightness of the screen is only rarely corrected, and if such takes place then only instinctively and guided by perception since there exist no clear and unambiguous reference values. The human eye perceives luminance differences only in logarithmic resolution and the adaptation to the particular luminance of the observed object (adaptation) occurs largely on the unconscious level. In the absence of sufficiently distinct warnings, a person will persist in an inadequate luminance environment until the overworked adaptation mechanism in the eye leads to noticeable fatigue. Due to the absence of an understanding of the physiological connections, the cause of the fatigue is still not recognized. Therefore the person involved can also not take suitable measures (namely the adaptation of the luminances of observed object and environment until an acceptable relationship between the two values is attained).

The present invention therefore addresses the problem of proposing a method or a device, with the aid of which the luminance of the screen is continuously and automatically adapted to the average luminance in the field of vision of the user.

The problem is solved according to the invention thereby that the display screen is coupled with an external light sensor which can be optionally placed in the room, which monitors the luminance distribution in the field of vision of the user.

In the following the invention will be described in conjunction with FIGS. 1 to 5.

FIG. 1 depicts the structure of the device. It comprises at least one light sensor 1, an operational connection 2, a control of the display screen luminance 3, a display screen 4 and a housing 5. The sensor 1 can be individually placed in the room and can be adjusted such that the acquired solid angle corresponds approximately to the field of vision of the user.

FIG. 2 shows one possible placement of the sensor 1. An electronic control 3 installed in the screen housing 5 or connectable to it by an interface ensures that brightness and contrast or background lighting on screen 4 are adjusted such that the display screen luminance is at an optimum ratio to the average luminance in the field of vision.

The adjustment buttons for brightness and contrast known on conventional screens could serve the user for the purpose of being able to match the automatic control of the screen luminance to his own personal preferences. A further capability for matching the control consists in the suitable placement and adjustment of sensor 1. The latter should in this case fairly accurately cover the solid angle which most often is frequented by the particular user during his viewing.

In the case of current display screens the luminance of the image area can be adjusted to between 0 and approximately 100 cd/m$^2$. With these values the luminance ratio of 1 to 3 in the field of vision can readily be attained. Maximum adjustment of the screen luminance (100 cd/m$^2$) would still ensure an acceptable luminance environment with average field of vision luminances of up to 300 cd/m$^2$. This value is hardly exceeded in rooms with well functioning sun and antidazzle measures.

One possible control characteristic is shown in FIG. 3. The average luminance in the field of vision $L_G$ relative to the screen luminance $L_B$ is linear in the lower range. In the limit range the curve approximates asymptotically the maximum screen luminance. But as soon as the optimum luminance ratio of 1 to 3 is exceeded, a control light on the screen housing 5 indicates such.

As an implementation opposite to the external light sensor 1 the integration of the light sensor 1 into the screen housing 5 itself would also be conceivable. It is also important in this case that the sensor 1 (or several sensors) covers the field of vision of the user and that the covered solid angle can as much as possible be flexibly adjusted.

One possible disposition of two sensors 1 on the screen housing 5 is shown in FIG. 4. The housing 5 here gets two "ears" at the two upper corners. At each of the tips of the ears is placed one light sensor. The sensors are adjusted such that the solid angle covered by the two sensors covers the full background of the display screen and corresponds approximately to the field of vision of the user.

FIG. 5 depicts one possible solution for the shielding of the sensor 1. The light sensor 1 is enveloped in a displaceable sleeve 6. Depending on the position of the sleeve a smaller or larger solid angle can be set.

Consequently a method for the automatic control of the luminance of display screens is proposed, in which through an externally disposed light sensor 1 the average luminance in the field of vision of the user is acquired and in which this uniquely quantifiable value serves as a reference value for an ergonomically faultless automatic control of the display screen luminance.

Also proposed is a device for carrying out the method with a display screen 4 with housing 5 provided with a control 3 for changing the screen luminance, in particular the brightness, the contrast and the background lighting, and the device comprises at least one light sensor 1, which is operationally connected to the control 3 such that by disposing the light sensor 1 in the direction of viewing, and the shielding of the same onto the field of vision area of the user, the luminance of the display screen 4 is automatically controllable as a function of the luminance distribution in the field of vision of the user.

One possible embodiment of the device is characterized thereby that the at least one light sensor 1 is disposed separately from the screen 4 at a favorable location in the room, and is operationally connected to the control 3 for example by wire or infrared, radio or ultrasound transmission.

The at least one light sensor 1 can also be disposed on the screen housing 5 itself. In this case the contrast and/or the brightness and/or the background lighting is also automatically controllable through the light sensor 1.

The device can also be employed with television screens or video terminals or other data viewing apparatus. It is also possible to control correspondingly a display apparatus, for example for measuring instruments and clocks.

The device can also be realized such that through an externally disposed control the looped-through RGB, video or YC signals are affected.

It is recommend to provide the control 3 with at least one control light, with the aid of which an unfavorable luminance ratio of screen 4 and environment can be indicated.

The invention claimed is:

1. An apparatus, comprising:
   an optical sensor for receiving optical signals and converting said optical signals into electrical signals;
   a regulating arrangement for counteracting a saturation of said optical sensor;
   a drive circuit operatively coupled to said optical sensor, said drive circuit including a first output line for providing a first electrical signal representing said optical signals received by said optical sensor at a first rate of change, and a second output line for providing a second electrical signal representing said optical signals received by said optical sensor at a second rate of change; and
   wherein said second electrical signal controls at least one operating parameter of an indication device.

2. The apparatus of claim 1, wherein:
   said drive circuit further includes filtering means for separating said electrical signals provided from said optical sensor into said first and second electrical signals; and
   said first rate of change is greater than said second rate of change.

3. The apparatus of claim 1, wherein said regulating arrangement adjusts current consumption of said optical sensor so that said first electrical signal is substantially independent of said second electrical signal.

4. The apparatus of claim 1, wherein said at least one operating parameter includes brightness.

5. The apparatus of claim 1, wherein said optical signals having said first rate of change correspond to command signals and said optical signals having said second rate of change represent ambient brightness.

6. An apparatus, comprising:
   an infrared reception module for receiving optical signals and converting said optical signals into electrical signals, said infrared reception module including a first output for providing a first electrical signal representing said optical signals received by said infrared reception module at a first rate of change;
   a control circuit for controlling current consumption of said infrared reception module, said control circuit including a second output for providing a second electrical signal responsive to said current consumption of said infrared reception module, said second electrical signal representing said optical signals received by said infrared reception module at a second rate of change; and
   wherein said second electrical signal controls at least one operating parameter of an indication device.

7. The apparatus of claim 6, wherein said control circuit includes a current mirror circuit for controlling said current consumption of said infrared reception module.

8. The apparatus of claim 7, wherein:
   said control circuit further includes filtering means operatively coupled to said current mirror circuit for providing at said second output only said second electrical signal; and
   said first rate of change is greater than said second rate of change.

9. The apparatus of claim 6, wherein said optical signals having said first rate of change correspond to command signals and said optical signals having said second rate of change represent ambient brightness.

10. The apparatus of claim 6, wherein said at least one operating parameter includes brightness.

11. A method for controlling a display device, comprising steps of:
   using an optical sensor to receive optical signals and convert said optical signals into electrical signals;
   controlling current consumption of said optical sensor;
   providing a first electrical signal representing said optical signals received by said optical sensor at a first rate of change;

providing a second electrical signal representing said optical signals received by said optical sensor at a second rate of change; and using said second electrical signal to control at least one operating parameter of said display device.

12. The method of claim 11, further comprised of separating said electrical signals provided from said optical sensor into said first and second electrical signals, and wherein said first rate of change is greater than said second rate of change.

13. The method of claim 11, wherein said at least one operating parameter includes brightness.

14. The method of claim 11, wherein said optical signals having said first rate of change correspond to command signals and said optical signals having said second rate of change represent ambient brightness.

* * * * *